United States Patent [19]
Mochizuki et al.

[11] Patent Number: 5,924,123
[45] Date of Patent: Jul. 13, 1999

[54] SEMICONDUCTOR STORAGE APPARATUS WITH COPY GUARD FUNCTION

[75] Inventors: Yoshio Mochizuki; Hideo Kato, both of Kawasaki, Japan

[73] Assignee: Kabushiki Kaisha Toshiba, Tokyo, Japan

[21] Appl. No.: 08/844,947

[22] Filed: Apr. 23, 1997

[51] Int. Cl.⁶ .................................................. G06F 12/00
[52] U.S. Cl. .................... 711/163; 711/100; 365/189.05; 365/200
[58] Field of Search ..................................... 711/163, 100, 711/3; 380/3; 395/186, 877; 365/200, 195, 189.05

[56] References Cited

U.S. PATENT DOCUMENTS

| | | | |
|---|---|---|---|
| 5,357,467 | 10/1994 | Hayashi | 365/189.05 |
| 5,396,609 | 3/1995 | Schmidt et al. | 711/163 |
| 5,406,519 | 4/1995 | Ha | 365/195 |
| 5,428,573 | 6/1995 | Watanabe | 365/200 |
| 5,473,756 | 12/1995 | Traylor | 395/877 |
| 5,642,480 | 6/1997 | Brownlee et al. | 395/186 |
| 5,737,566 | 4/1998 | Sparks et al. | 711/100 |
| 5,781,627 | 7/1998 | Ikuta et al. | 380/3 |

FOREIGN PATENT DOCUMENTS 173244  7/1989  Japan.

*Primary Examiner*—John W. Cabeca
*Assistant Examiner*—Nasser Moazzami
*Attorney, Agent, or Firm*—Loeb & Loeb LLP

[57] ABSTRACT

For copy guard, an ROM comprises an address data determining circuit, an address sequence monitoring circuit, an error address data generating circuit, and an output selection circuit. The address sequence monitoring circuit monitors the addresses stored in the address data determining circuit and input addresses to determine whether or not the input addresses are in a predetermined sequence of the addresses in the address data determining circuit. The output selection circuit outputs data read from said memory cell array when the address sequence monitoring circuit determines that the address sequence of the input addresses coincides with the predetermined sequence of the addresses stored in the address data determining circuit and outputs error data generated by the error data generating circuit when a determination is made that the sequence of the input addresses does not coincide with the predetermined sequence.

10 Claims, 6 Drawing Sheets

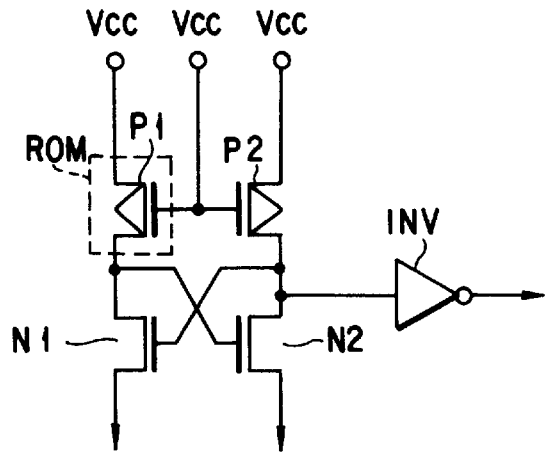
F I G. 2
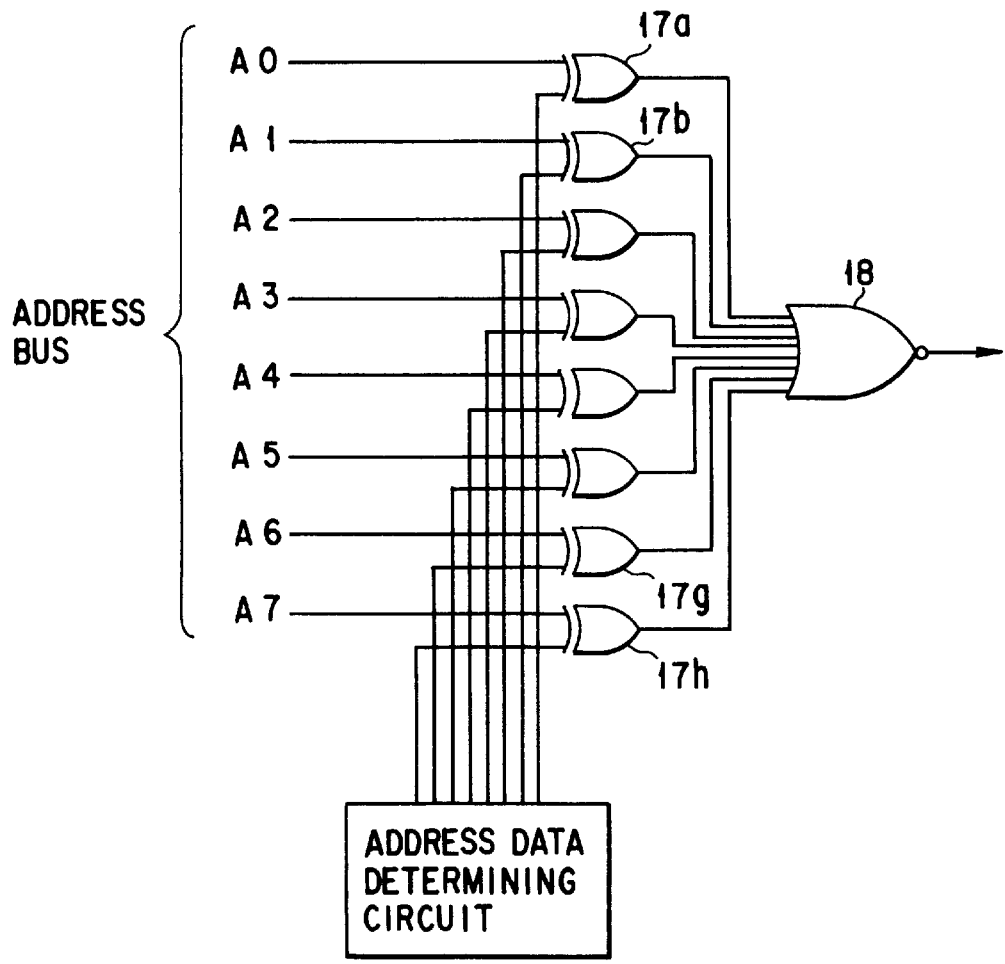
F I G. 3

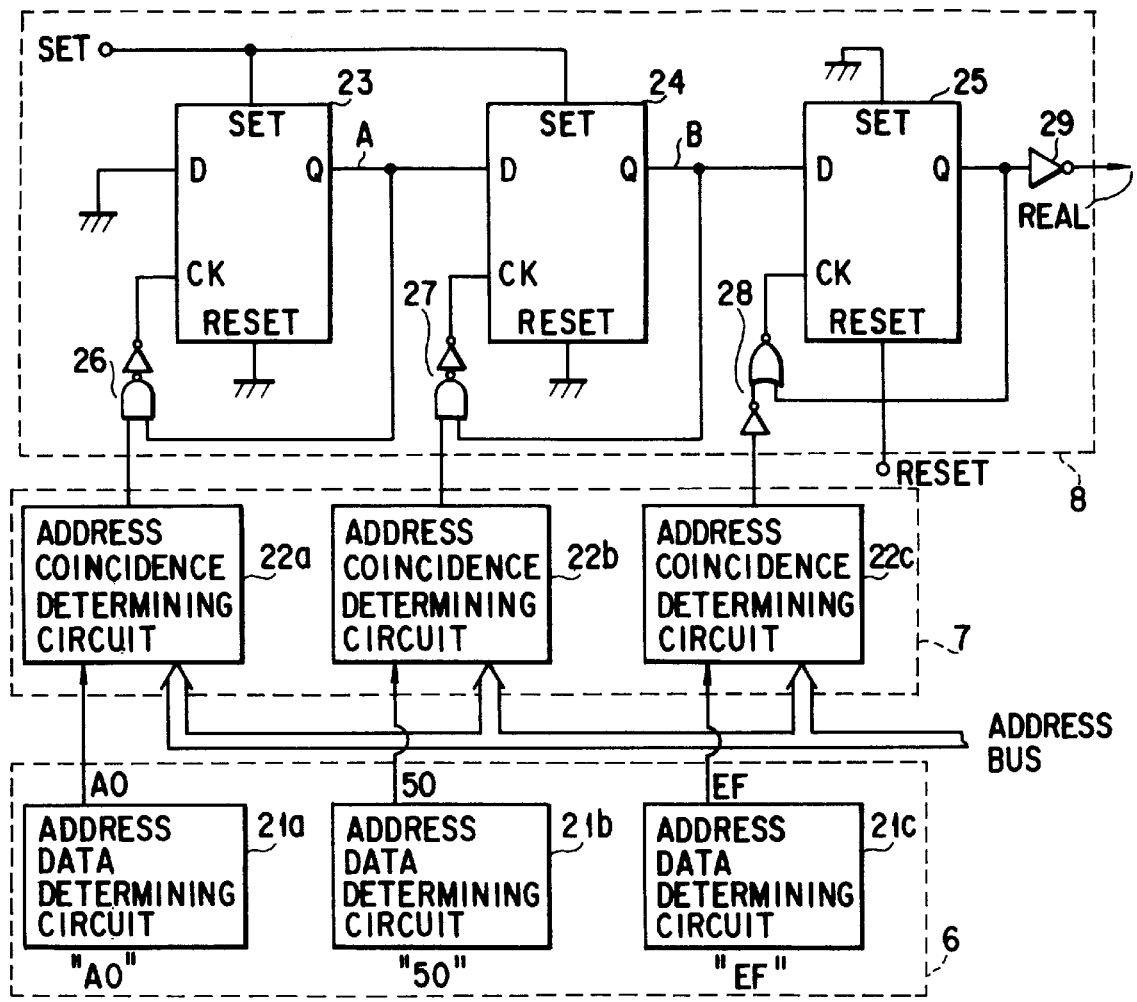
FIG. 4
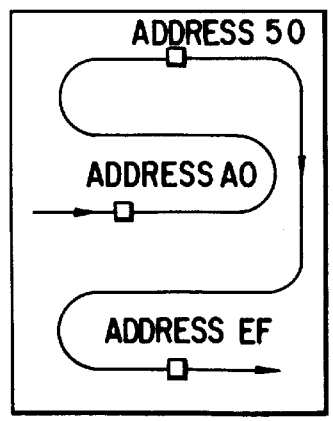 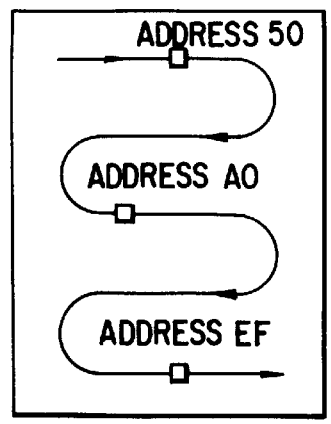
FIG. 5A   FIG. 5B

5,924,123

SEMICONDUCTOR STORAGE APPARATUS WITH COPY GUARD FUNCTION

BACKGROUND OF THE INVENTION

The present invention relates to a semiconductor storage apparatus, and more particularly to a read only memory (hereinafter called as a "ROM") having a copy guard function.

FIG. 10 shows a structure of a conventional ROM. The ROM is composed of an input buffer circuit 1 to which an address signal is supplied from outside, an address buffer circuit 1 to which an output signal from the input buffer circuit 2 is supplied, an address decoder 3 to which an output signal from the address buffer circuit 2 is supplied through an address bus, a memory cell 4, a sense amplifier 5 to which data in the memory cell 4 is supplied, and an output buffer circuit 11 to which an output signal from the sense amplifier 5 is supplied. The address signal supplied from the outside is stored in the address buffer 2 through the input buffer circuit 1. The address decoder 3 selects a memory cell at an address corresponding to the address signal stored in the address buffer 2. Data stored in the selected memory cell is supplied to the output buffer circuit 11 through the sense amplifier 5, and then output from the output buffer circuit 11 to the outside.

A ROM having the above-mentioned structure permits the contents thereof to easily be copied by reading data therein by sequentially making accesses to the addresses in the ROM to cause another nonvolatile memory or the like to sequentially store the data. If a ROM, in which software of, for example, a video game has been stored, is copied, the manufacturer and the dealer sustains a great economic loss. Therefore, copy guard of data in the ROM is an important issue.

BRIEF SUMMARY OF THE INVENTION

In view of the foregoing, an object of the present invention is to provide a semiconductor storage apparatus which is capable of preventing copy of data stored in a memory.

To achieve the foregoing object, according to the present invention, there is provided a semiconductor storage apparatus comprising: a memory cell array for storing data; reading means for reading data from the memory cell array in accordance with input addresses; address data determining means in which checking addresses is stored, the checking addresses being ordered in a predetermined sequence; address sequence monitoring means for monitoring a sequence of input addresses and the predetermined sequence of checking addresses to determine whether or not the sequence of the input addresses coincides with the predetermined sequence of the checking addresses; an error data generating circuit for generating error data; and an output selection circuit for selecting data read from the memory cell array when the address sequence monitoring means determines that the sequence of the input addresses coincides with the predetermined sequence of the checking addresses, and selecting error data generated by the error data generating circuit when the sequence of the input addresses is not in coincidence with the predetermined sequence of the checking addresses.

The predetermined sequence may be out of continuity.

The address data determining means may include a plurality of address data storing circuits for storing the checking addresses, the plurality of address data storing circuits being ordered in the predetermined sequence; the address sequence monitoring means may include a plurality of address coincidence detecting circuits provided in correspondence to the address data storing circuits of the address data determining means, and a plurality of shift register circuits provided in correspondence to the plurality of address coincidence detecting circuits, the address coincidence detecting circuits each comparing the checking address stored in a corresponding address data storing circuit with the input addresses, and outputting a coincidence output signal when the checking address coincides with the input addresses, the shift register circuits each receiving the output signal of a corresponding coincidence detecting circuit, the shift register circuits being operated such that an output logic level of the shift register circuits is converted to an opposite logic level when the sequence of the input addresses is in not coincidence with the predetermined sequence of the checking addresses.

The shift registers may be made of DQ flip flop circuits; and the address sequence monitoring means may further include a plurality of logic gates provided in correspondence to the address coincidence detecting circuits and the flip flop circuits, and a level inverter, each of the logic gates for receiving the output signal of a corresponding coincidence detecting circuit and an output signal of a corresponding flip flop circuit to output a logic signal to a CK terminal of the corresponding flip flop circuit.

SET terminals and RESET terminals of those of the flip flop circuits, which are of a first bit stage to a bit stage one bit stage prior to the final bit stage, may be connected to SET signal and a reference potential, respectively; a SET terminal and a RESET terminal of that of the flip flop circuits, which is of the final bit stage, may be connected to a reference potential and SET signal, respectively; those of the logic gates, which are of a first bit stage to a bit stage one bit stage prior to the final bit stage, may be made of two-input AND gates; that of the flip flop circuits, which is the final bit stage, may be made of two-input OR gates; and the level inverter may be connected to Q output terminal of the final bit stage flip flop circuit to invert the level of the Q output signal forming an output signal of the address sequence monitoring means.

According to the present invention, there is further provided a semiconductor storage apparatus comprising: a memory cell array for storing data; reading means for reading data from the memory cell array in accordance with input addresses; address data determining means in which checking addresses and a predetermined sequence of the checking addresses are stored; address sequence monitoring means for monitoring a sequence of input addresses and the predetermined sequence of checking addresses to determine whether or not the sequence of the input addresses coincides with the predetermined sequence of the checking addresses; an error data generating circuit for generating error data; and an output selection circuit for selecting data read from the memory cell array when the address sequence monitoring means determines that the sequence of the input addresses coincides with the predetermined sequence of the checking addresses, and selecting error data generated by the error data generating circuit when the sequence of the input addresses is not in coincidence with the predetermined sequence of the checking addresses.

The predetermined sequence may be out of continuity.

The address data determining means may include a plurality of address data storing circuits for storing the checking addresses and the predetermined sequence; the address sequence monitoring means may include a plurality of address coincidence detecting circuits provided in correspondence to the address data storing circuits of the address data determining means, and a plurality of shift register circuits provided in correspondence to the plurality of address coincidence detecting circuits, the address coincidence detecting circuits each comparing the checking address stored in a corresponding address data storing circuit with the input addresses, and outputting a coincidence output signal when the checking address coincides with the input addresses, the shift register circuits each receiving the output signal of a corresponding coincidence detecting circuit, the shift register circuits being operated such that an output logic level of the shift register circuits is converted to an opposite logic level when the sequence of the input addresses is in not coincidence with the predetermined sequence of the checking addresses.

The shift registers may be made of DQ flip flop circuits; and the address sequence monitoring means may further include a plurality of logic gates provided in correspondence to the address coincidence detecting circuits and the flip flop circuits, and a level inverter, each of the logic gates for receiving the output signal of a corresponding coincidence detecting circuit and an output signal of a corresponding flip flop circuit to output a logic signal to a CK terminal of the corresponding flip flop circuit.

SET terminals and RESET terminals of those of the flip flop circuits, which are of a first bit stage to a bit stage one bit stage prior to the final bit stage, may be connected to SET signal and a reference potential, respectively; a SET terminal and a RESET terminal of that of the flip flop circuits, which is of the final bit stage, may be connected to a reference potential and a SET signal, respectively; those of the logic gates, which are of a first bit stage to a bit stage one bit stage prior to the final bit stage are, may be made of two-input AND gates; that of the flip flop circuits, which is the final bit stage, is made of two-input OR gates; and the level inverter is connected to Q output terminal of the final bit stage flip flop circuit to invert the level of the Q output signal forming an output signal of the address sequence monitoring means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a circuit diagram showing an address data detecting circuit according to the present invention;

FIG. 3 is a circuit diagram showing an address coincidence detecting circuit according to the present invention;

FIG. 4 is a block diagram showing an address data detecting circuit, the address coincidence detecting circuit and an address sequence monitoring circuit according to the present invention;

FIGS. 5A and 5B are diagrams showing address access sequences;

DETAILED DESCRIPTION OF THE INVENTION

Figure 1:
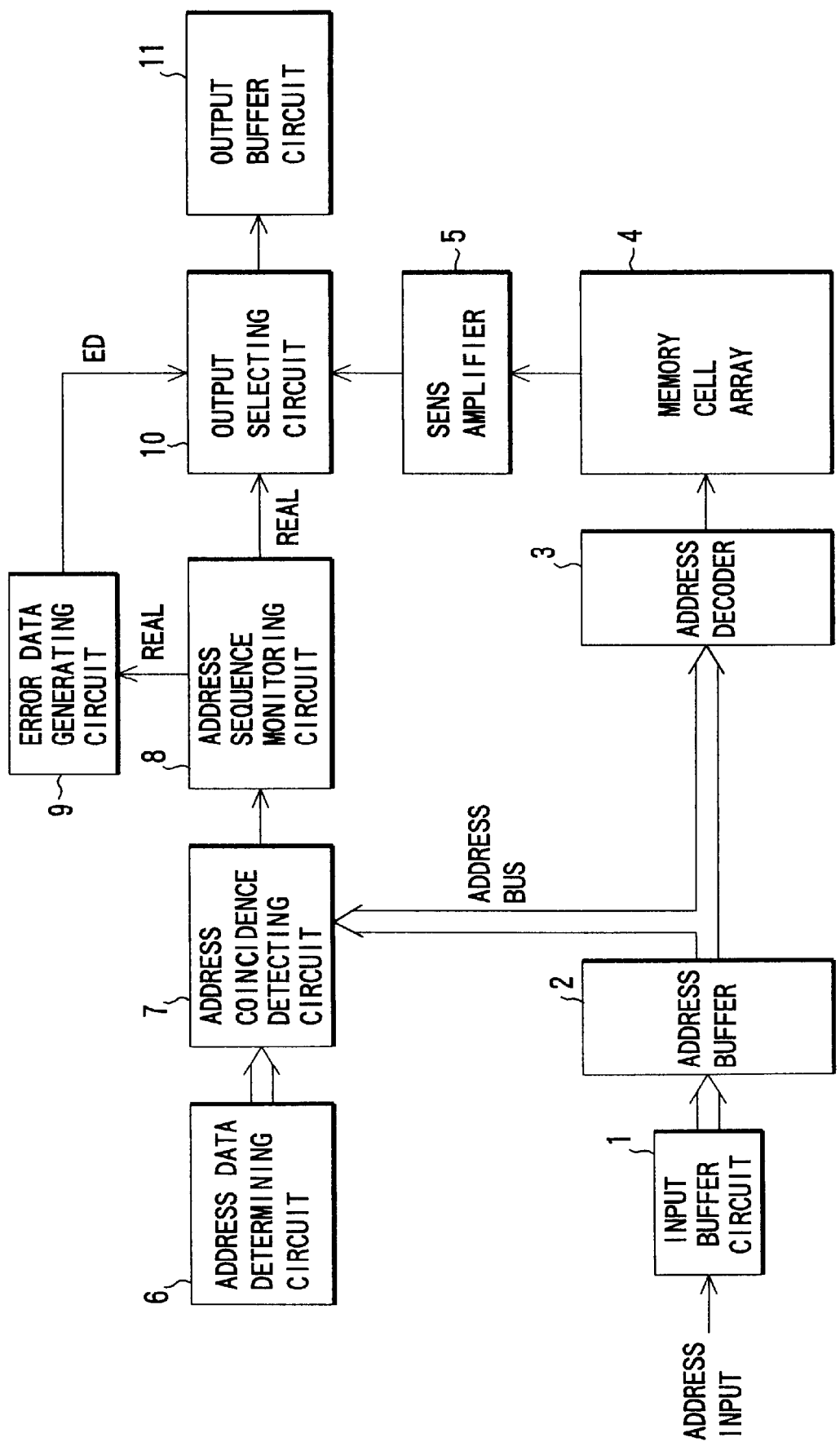
FIG. 1 is a block diagram showing a semiconductor apparatus according to an embodiment of the present invention.

Referring to the drawings, an embodiment of the present invention will now be described.

FIG. 1 is a circuit diagram showing a semiconductor storage apparatus according to the embodiment of the present invention. An address signal supplied from outside is supplied to an input buffer circuit 1. An address signal output from the input buffer circuit 1 is supplied to an address buffer 2. The address buffer 2 supplies an address signal to an address bus. An address decoder 3 selects a memory cell in the memory cell array 4 at an address corresponding to the address signal on the address bus. Data stored in the selected memory cell of the memory cell array 4 is output to an output selection circuit 10 through a sense amplifier 5.

An address data determining circuit 6 previously stores a plurality of address data, i.e., checking address data. The plurality of address data are ordered in a predetermined sequence. An address coincidence detecting circuit 7 is connected to an output terminal of the address data determining circuit 6 and the address bus to receive the plurality of address data stored in the address data determining circuit 6 and the address signals on the address bus. The address coincidence detecting circuit 7 monitors the plurality of address data stored in the address data determining circuit 6 and the address signal on the address bus to supply a coincidence signal to an address sequence monitoring circuit 8 when the addresses stored in the address data determining circuit coincide with the address signal on the address bus. In response to the coincidence signal supplied from the address coincidence detecting circuit 7, the address sequence monitoring circuit 8 monitors whether or not the plural addresses stored in the address data determining circuit 6 have been accessed in a predetermined sequence to output, to an error data generating circuit 9 and an output selection circuit 10, signal REAL indicating whether the sequence coincides with or is different from the predetermined sequence. When the signal REAL supplied from the address sequence monitoring circuit 8 indicates that the memory cell array 4 has been accessed in a sequence different from the predetermined sequence, the error data generating circuit 9 generates error data ED and supplies the error data ED to an input terminal of the output selection circuit 10. In response to the signal REAL supplied from the address sequence monitoring circuit 8, the output selection circuit 10 outputs data stored in the memory cell array 4 to an output buffer circuit 11 when the memory cell array 4 has been accessed in the predetermined sequence. When on the other hand the access has been made in a sequence different from the predetermined sequence, then the output selection circuit 10 outputs, to the output buffer circuit 11, the error data ED supplied from the error data generating circuit 9. The output buffer circuit 11 outputs, to the outside, data supplied from the output selection circuit 10. Error data which is output from the error data generating circuit 9 is arbitrary data.

An example of a circuit according to the present invention will now be described. FIGS. 2, 3, 4 and 8 respectively show the address data determining circuit, the address coincidence detecting circuit, the address sequence monitoring circuit and the output selection circuit.

FIG. 2 shows an example of a circuit forming the address data determining circuit. The circuit stores one bit of address data. The sources and gates of p-channel transistors P1 and P2 are supplied with a power supply voltage, while the drains of the p-channel transistors P1 and P2 respectively are connected to the drains of n-channel transistors N1 and N2. The sources of the n-channel transistors N1 and N2 are grounded. The gate of the n-channel transistor N1 is connected to the drain of the p-channel transistor P2, while the gate of the n-channel transistor N2 is connected to the drain of the p-channel transistor P1. The drain of the p-channel transistor P2 is connected to an input terminal of an inverter INV so that an output signal from the inverter INV is made to be an output signal from the address data.

In the circuit shown in FIG. 2, the p-channel transistor P1 serves as a ROM region. Ion implantation into the channel portion of the transistor P1 is controlled to set the transistor P1 to a normally OFF state or a normally ON state so as to store data. Since the transistor P2 is in the form of normally OFF, when a power supply is turned on, the inverter INV is caused to output "1" when the transistor P1 is in the form of normally ON. If the transistor P1 is in the form of normally OFF, "0" is output.

If the address bus has an 8-bit structure and the access sequence of three addresses is attempted to be monitored, three address data determining circuits 21a, 21b and 21c each of which is composed of eight circuits shown in FIG. 2 and which is structured as shown in FIG. 4 are prepared. In a case where data is read in a usual operation and an assumption is made that data in the memory is read out in such a sequence as address A0, address 50 and address EF as shown in FIG. 5A, "A0", "50" and "EF" respectively are stored in the address data determining circuits 21a, 21b and 21c.

An output terminal of the address data determining circuit 21a storing "A0" is, as shown in FIG. 4, connected to the input terminal of an address coincidence detecting circuit 22a. The address bus is connected to another input terminal of the address coincidence detecting circuit 22a. FIG. 3 shows an example of the address coincidence detecting circuit. If the address bus is formed into an 8-bit structure, bit lines A0 to A7 of the address bus respectively are connected to first input terminals of eight exclusive OR circuits 17a to 17h each having a two-input structure. Second input terminals of the exclusive OR circuits 17a to 17h are connected to the output terminal of the address data determining circuit 21a. Output terminals of the exclusive OR circuits 17a to 17h are connected to the input terminal of a NOR circuit 18. An output terminal of the NOR circuit 18 serves as the output terminal of the address coincidence detecting circuit 22a. The address data determining circuits 21b and 21c and the address coincidence detecting circuits 22b and 22c have similar structures.

The address sequence monitoring circuit 8 is, for example, as shown in FIG. 4, composed of shift registers 23, 24 and 25 and logical gates 26, 27, 28 and 29. Shift registers 23, 24, and 25 are comprised of DQ flip flop circuits in this embodiment. A data input terminal D and a RESET terminal of the shift register 23 are grounded, while a SET terminal of the shift register 23 is supplied with a set signal. A clock terminal CK of the shift register 23 is supplied with a logical product 26 of an output signal from the address coincidence detecting circuit 22a and an output signal from an output terminal Q of the shift register 23. Moreover, the output terminal Q of the shift register 23 is connected to a data input terminal D of the shift register 24. The SET terminal of the shift register 24 is supplied with the set signal, while the RESET terminal of the shift register is grounded. A clock terminal CK of the shift register 24 is supplied with a logical product 27 of an output signal from the address coincidence detecting circuit 22b and an output signal from an output terminal Q of the shift register 24. The output terminal Q of the shift register 24 is connected to a data input terminal D of the shift register 25. The reset terminal of the shift register 25 is supplied with the reset signal, while the set terminal of the shift register is grounded. A clock terminal CK of the shift register 25 is supplied with a NOR signal 28 of an output signal from the address coincidence detecting circuit 22c and an output signal from an output terminal Q of the shift register 25. An inversion signal of the signal output from the output terminal Q of the shift register 25 is made to be the output signal REAL from the address sequence monitoring circuit.

Figure 6:
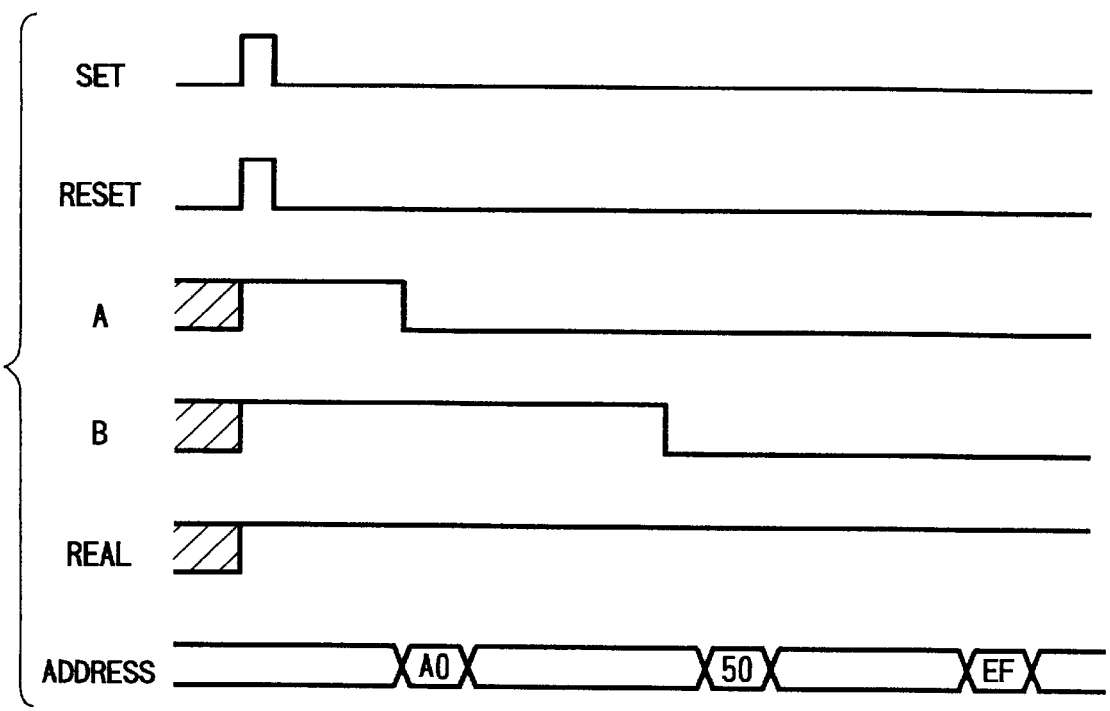
FIG. 6 is a timing signal chart showing the operation of the address sequence monitoring circuit which is performed when an access is made in a usual sequence.
Figure 7:
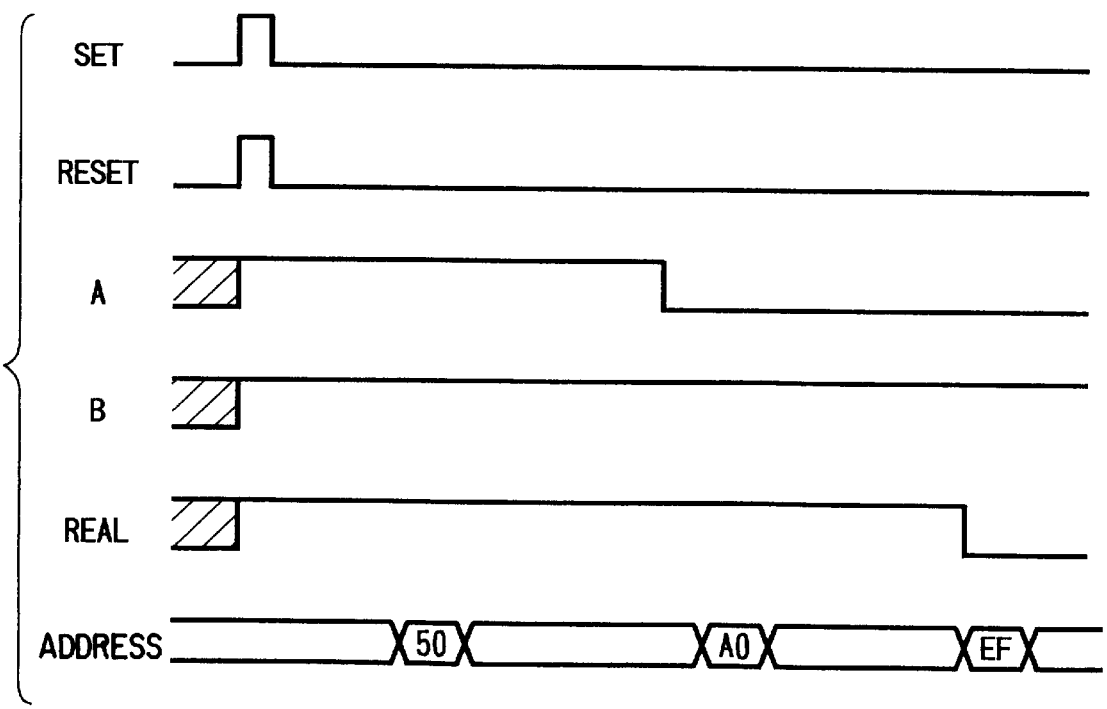
FIG. 7 is a timing signal chart showing the operation of the address sequence monitoring circuit which is performed when an access is performed in an sequence different from the usual sequence.

FIGS. 6 and 7 are timing signal charts showing the operation of the address sequence monitoring circuit shown in FIG. 4. FIG. 6 is a timing signal chart of the operation of the address sequence monitoring circuit which is performed when, for example, the addresses 50, A0 and EF are accessed in a predetermined sequence, that is, the addresses are accessed in a sequence of A0→50→EF, as shown in FIG. 5A. FIG. 7 shows the operation of the address sequence monitoring circuit which is performed when an access is made to read data for the purpose of copying, for example, the contents of the ROM, that is, when an access is performed in a sequence of 50→A0→EF, as shown in FIG. 5B. Reference numerals A and B shown in FIGS. 6 and 7 represent signals at the output terminals Q of the shift registers 23 and 24 shown in FIG. 4, and REAL represents an inversion signal of the signal at the output terminal Q of the shift register 25. When the power supply is turned on, the set signal and the reset signal are supplied to the address sequence monitoring circuit, and signals A, B and REAL are set to "1". In a case where the addresses stored in the address data determining circuit are read out in the predetermined sequence, signal REAL is always "1", as shown in FIG. 6. However, if addresses are read in a sequence different from the usual sequence, signal REAL is made to be "0", as shown in FIG. 7. In the case as shown in FIG. 7, signal OUT is changed from "1" to "0" when the address signal has been made to be "EF".

The operation of the circuit arrangement shown in FIG. 4 is described in more detail when reference to the timing signal charts shown in FIGS. 6 and 7. When the power supply is turned on, an "1" level SET signal is supplied to SET terminals of shift registers 23 and 24, and an "1" level RESET signal is supplied to SET terminal of shift register 25 (FIG. 6). Accordingly, an output signal A of the Q terminal of shift register 23 is "1" level, an output signal B of the Q terminal of shift register 24 is "1" level, and REAL signal (an inversion signal of an output signal of Q terminal of shift register 25) is "1" level (FIG. 6). An assumption is made that address data determining circuitdetermining circuits 21a, 21b, and 21c store addresses "A0", "50", and "EF", respectively. An assumption is also made that an address signal of "A0" is input via address bus to address coincidence detecting circuits 22a, 22b, and 22c. In this situation, address coincidence detecting circuit 22a detects a coincidence of the address of the input address signal input via the address bus and the addresses stored in the address data determining circuit 21a. Accordingly, address coincidence detecting circuit 22a outputs "1" level output signal, while the outputs of the other detecting circuits 22b and 22c are "0" level. Thus, only logic gate 26 is established to output a "1" level output to a CK terminal of shift register 23. Since D terminal of shift register 23 is connected to ground, i.e., logic "0" level, then output signal A of the Q terminal of shift register 23 is changed to "0" level, while output signal B of the Q terminal of shift register 24 and an output signal of the Q terminal of shift register 25 are not changed and retained in "0" level. Thus, REAL output signal is also not changed and retained in "0" level (FIG. 6).

An assumption is then made that the address signal is changed from "A0" to "50". In this situation, address coincidence detecting circuit 22b detects a coincidence of the address of the input address signal input via the address bus and the addresses stored in the address data determining circuit 21b. Accordingly, address coincidence detecting circuit 22b outputs "1" level output signal, while the outputs of the other detecting circuits 22a and 22c are "0" level. Thus, only logic gate 27 is established to output a "1"level output to a CK terminal of shift register 24. Since D terminal is connected to Q output potential of shift register 24, i.e., "0" level output, then output signal B of the Q terminal of shift register 24 is changed to "0" level, while the output signal of the Q terminal of shift register 25 is retained in "0"level, and thus REAL output signal is retained in "1" level (FIG. 6).

An assumption is then made that the address signal of "50" is changed from "50" to "EF". In this situation, address coincidence detecting circuit 22c detects a coincidence of the address of the input address signal input via the address bus and the addresses stored in the address data determining circuit 21c. Accordingly, address coincidence detecting circuit 22c outputs "1" level output signal, while the outputs of the other detecting circuits 22a and 22b are "0" level. Thus, logic gate 28 outputs a "1" level output signal to a CK terminal of shift register 25. Since D terminal of shift register 25 is connected to the Q output signal of shift register 24, i.e., "0" level, then the output signal of the Q terminal of shift register 25 is retained in "0" level, and thus REAL output signal is retained in "1" level (FIG. 6).

Addresses stored in the address data determining circuit may be addresses of data region of the memory, or addresses of program region of the memory. The predetermined sequence of the checking addresses may be stored in the address data determining circuit.

Figure 8:
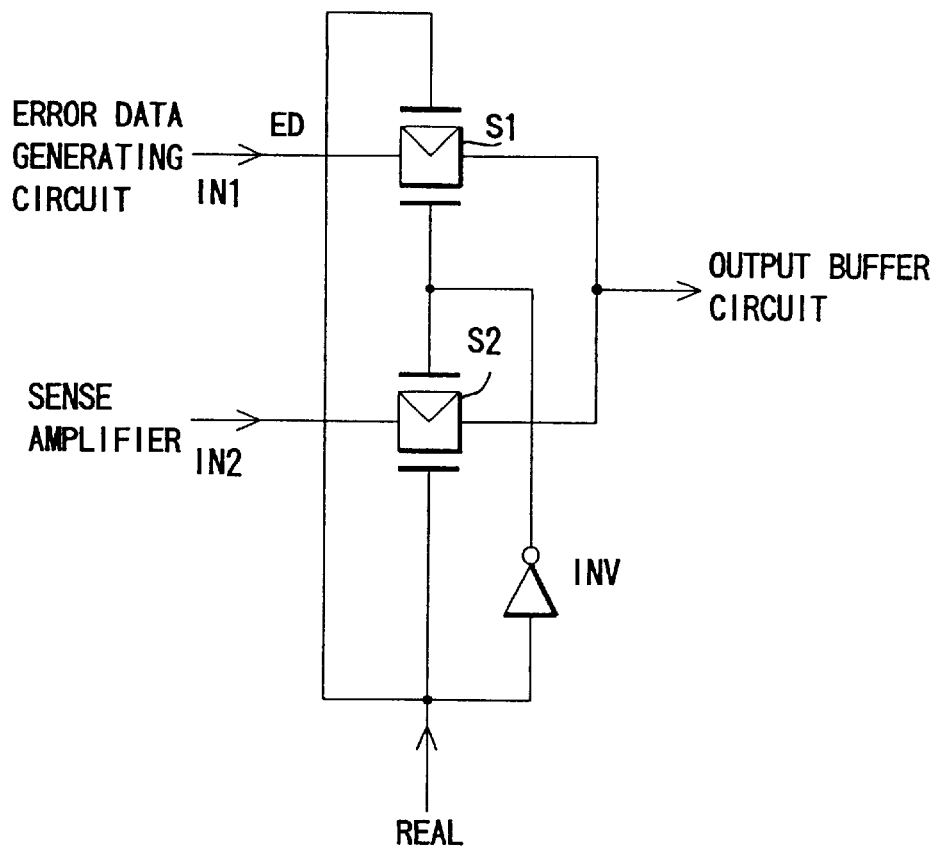
FIG. 8 is a circuit diagram showing an output selection circuit according to the present invention.

FIG. 8 shows an example of the output selection circuit. The output selection circuit is composed of a double-channel transfer gate S1 having an input terminal IN1, to which the error data ED output from the error data generating circuit 9 is supplied, an output terminal connected to the input terminal of the output buffer circuit 11, a p-channel transistor having a gate to which the signal REAL output from the address sequence monitoring circuit is supplied and an n-channel transistor having a gate to which an inversion signal of the signal REAL is supplied; and a double-channel transfer gate S2 having an input terminal IN2 to which an output signal from the sense amplifier 5 is supplied, an output terminal connected to the input terminal of the output buffer circuit, a p-channel transistor having a gate to which an inversion signal of the signal REAL output from the address sequence monitoring circuit is supplied and an n-channel transistor having a gate to which the signal REAL is supplied. The transfer gate S1 is turned conductive when the signal REAL output from the address sequence monitoring circuit 8 is "0" and turned nonconductive when the signal REAL output from the address sequence monitoring circuit 8 is "1". The transfer gate S2 is turned nonconductive when the signal REAL output from the address sequence monitoring circuit is "0" and turned conductive when the signal REAL output from the address sequence monitoring circuit is "1". Therefore, when the access has been made in the predetermined sequence, the output selection circuit 10 outputs data in the memory cell array 4 to the output buffer circuit 11. When the access has been made in a sequence different from the predetermined sequence, the output selection circuit 10 outputs, to the output buffer circuit 11, error data supplied from the error data generating circuit 9.

Figures 9A, 9B:
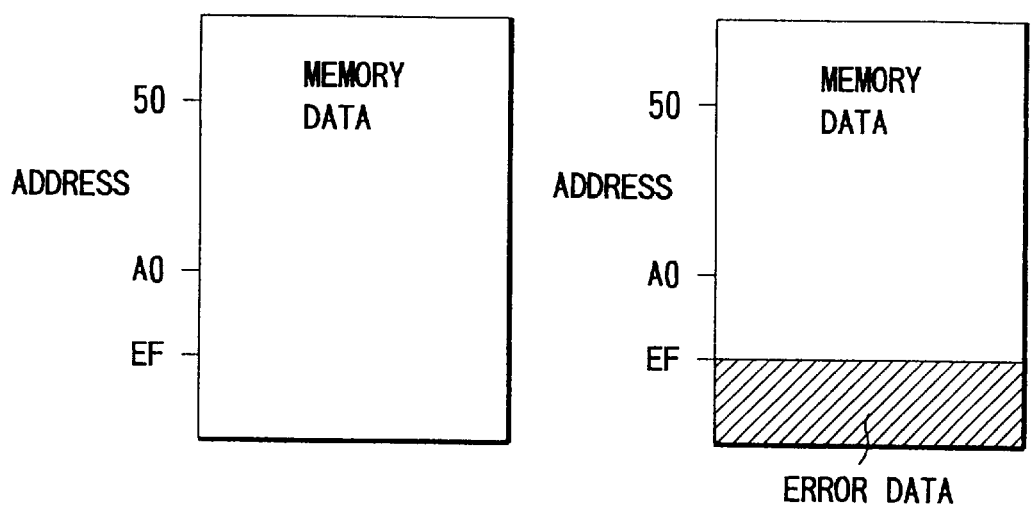
FIGS. 9A and 9B are diagrams used for explaining an effect of the present invention.
Figure 10:
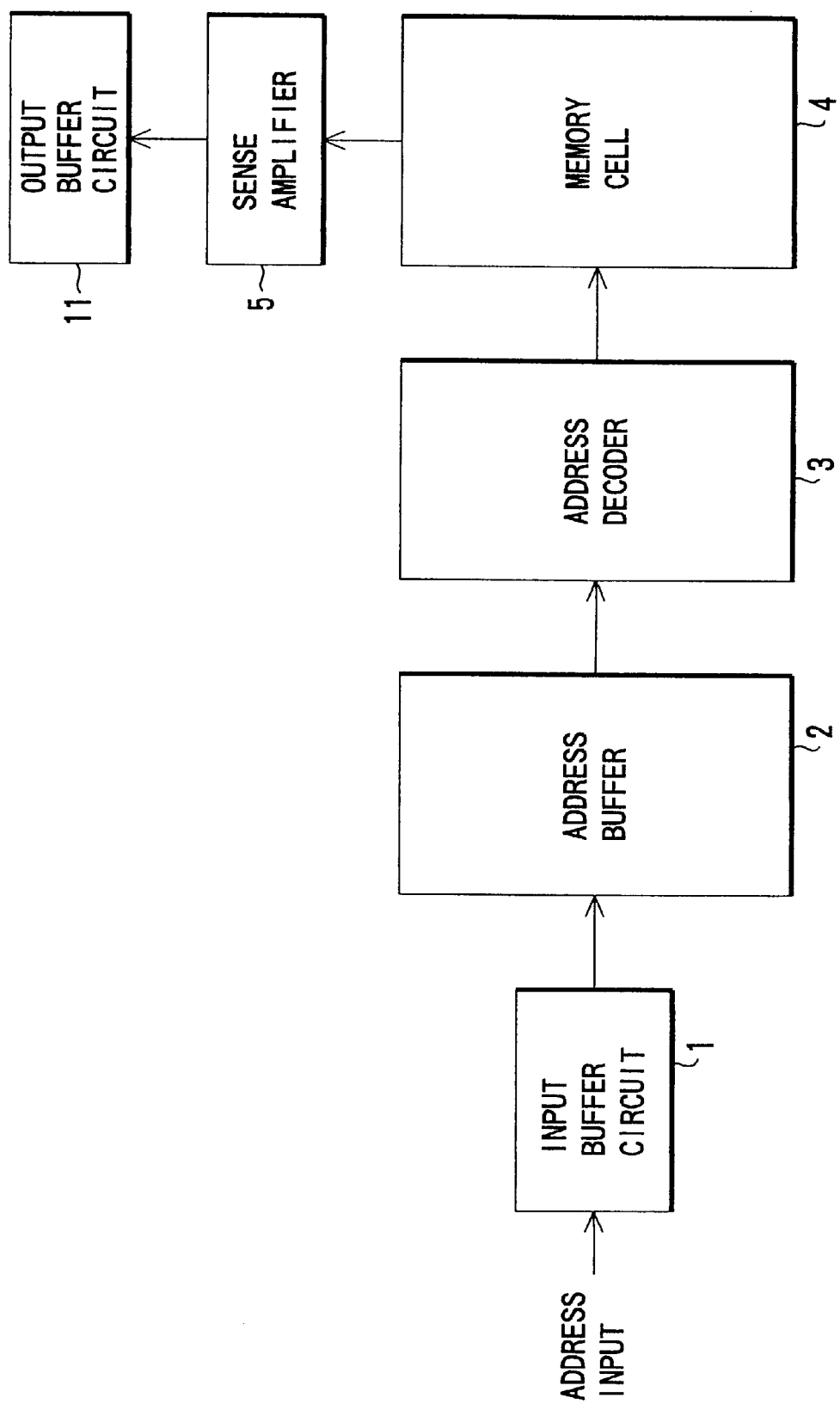
FIG. 10 is a block diagram showing a conventional ROM.

Therefore, in a case where the contents of the memory cell array 4 are read out in a sequence, for example, as shown in FIG. 5B, data is output to the outside from the output buffer circuit 11, in a manner as shown in FIG. 9B. That is, data stored in address 00 to address EF of the memory cell array 4 is read out, as shown in FIG. 9A. However, from address EF, error data generated by the error data generating circuit is output.

Therefore, even when data stored in the memory according to this embodiment is attempted to be copied, accurate copying of data is substantially inhibited.

Although the description has been performed about the ROM, the present invention is not limited to the ROM and applicable to other types of memory.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. A semiconductor storage apparatus comprising:
    a memory cell array for storing data;
    reading means for reading data from said memory cell array in accordance with input addresses;
    address data determining means in which checking addresses are stored, the checking addresses being ordered in a predetermined sequence, the predetermined sequence being out of continuity;
    address sequence monitoring means for monitoring a sequence of input addresses and said predetermined sequence of checking addresses to determine whether or not the sequence of the input addresses coincides with said predetermined sequence of said checking addresses;
    an error data generating circuit for generating error data; and
    an output selection circuit for selecting data read from said memory cell array when said address sequence monitoring means determines that the sequence of the input addresses coincides with said predetermined sequence of said checking addresses, and selecting error data generated by said error data generating circuit when the sequence of the input addresses is not in coincidence with said predetermined sequence of the checking addresses.

2. A semiconductor storage apparatus according to claim 1, wherein
    said address data determining means includes a plurality of address data storing circuits for storing said checking addresses, the plurality of address data storing circuits being ordered in said predetermined sequence;

said address sequence monitoring means includes a plurality of address coincidence detecting circuits provided in correspondence to said address data storing circuits of said address data determining means, and a plurality of shift register circuits provided in correspondence to said plurality of address coincidence detecting circuits, the address coincidence detecting circuits each comparing the checking address stored in a corresponding address data storing circuit with the input addresses, and outputting a coincidence output signal when the checking address coincides with the input addresses, the shift register circuits each receiving the output signal of a corresponding coincidence detecting circuit, the shift register circuits being operated such that an output logic level of the shift register circuits is converted to an opposite logic level when the sequence of the input addresses is not in coincidence with the predetermined sequence of the checking addresses.

3. A semiconductor storage apparatus according to claim 2, wherein:

said shift registers are made of DQ flip flop circuits; and said address sequence monitoring means further include a plurality of logic gates provided in correspondence to said address coincidence detecting circuits and said flip flop circuits, and a level inverter, each of the logic gates for receiving the output signal of a corresponding coincidence detecting circuit and an output signal of a corresponding flip flop circuit to output a logic signal to a CK terminal of the corresponding flip flop circuit.

4. A semiconductor storage apparatus according to claim 3, wherein:

SET terminals and RESET terminals of those of said flip flop circuits, which are of a first bit stage to a bit stage one bit stage prior to the final bit stage, are connected to a SET signal and a reference potential, respectively;

a SET terminal and a RESET terminal of that of said flip flop circuits, which is of the final bit stage, are connected to a reference potential and a SET signal, respectively;

those of said logic gates, which are of a first bit stage to a bit stage one bit stage prior to the final bit stage, are made of two-input AND gates;

that of said flip flop circuits, which is the final bit stage, is made of a two-input OR gate; and said level inverter is connected to Q output terminal of the final bit stage flip flop circuit to invert the level of the Q output signal forming an output signal of the address sequence monitoring means.

5. A semiconductor storage apparatus comprising:

a memory cell array for storing data;

reading means for reading data from said memory cell array in accordance with input addresses;

address data determining means in which checking addresses and a predetermined sequence of the checking addresses are stored, the predetermined sequence being out of continuity;

address sequence monitoring means for monitoring a sequence of input addresses and said predetermined sequence of checking addresses to determine whether or not the sequence of the input addresses coincides with said predetermined sequence of said checking addresses;

an error data generating circuit for generating error data; and an output selection circuit for selecting data read from said memory cell array when said address sequence monitoring means determines that the sequence of the input addresses coincided with said predetermined sequence of said checking addresses, and selecting error data generated by said error data generating circuit when the sequence of input addresses is not in coincidence with said predetermined sequence of the checking addresses.

6. A semiconductor storage apparatus according to claim 5, wherein said address data determining means includes a plurality of address data storing circuits for storing said checking addresses and said predetermined sequence of the checking addresses;

said address sequence monitoring means includes a plurality of address coincidence detecting circuits provided in correspondence to said address data storing circuits of said address data determining means, and a plurality of shift register circuits provided in correspondence to said plurality of address coincidence detecting circuits, the address coincidence detecting circuits each comparing the checking address stored in a corresponding address data storing circuit with the input addresses, and outputting a coincidence output signal when the checking address coincides with the input addresses, the shift register circuits each receiving the output signal of a corresponding coincidence detecting circuit, the shift register circuits being operated such that an output logic level of the shift register circuits is converted to an opposite logic level when the sequence of the input addresses is not in coincidence with the predetermined sequence of the checking addresses.

7. A semiconductor storage apparatus according to claim 6, wherein:

said shift registers are made of DQ flip flop circuits; and said address sequence monitoring means further include a plurality of logic gates provided in correspondence to said address coincidence detecting circuits and said flip flop circuits, and a level inverter, each of the logic gates for receiving the output signal of a corresponding coincidence detecting circuit and an output signal of a corresponding flip flop circuit to output a logic signal to a CK terminal of the corresponding flip flop circuit.

8. A semiconductor storage apparatus according to claim 7, wherein:

SET terminals and RESET terminals of those of said flip flop circuits which are of a first bit stage to a bit stage one bit stage prior to the final bit stage are connected to a SET signal and a reference potential, respectively;

a SET terminal and a RESET terminal of that of said flip flop circuits which is of the final bit stage are connected to a reference potential and a SET signal, respectively;

those of said logic gates which are of a first bit stage to a bit stage one bit stage prior to the final bit stage are made of two-input AND gates;

that of said flip flop circuits which is the final bit stage is made of a two input OR gate; and said level inverter is connected to a Q output terminal of the final bit stage flip flop circuit to invert the level of the Q output signal forming an output signal of the address sequence monitoring means.

9. A semiconductor storage apparatus comprising:

a memory cell array for storing data;

reading means for reading data from said memory cell array in accordance with input addresses;

address data determining means in which checking addresses are stored, the checking addresses being ordered in a predetermined sequence, the address data determining means including a plurality of address data storing circuits for storing said checking addresses, the plurality of address data storing circuits being ordered in said predetermined sequence;

address sequence monitoring means for monitoring a sequence of input addresses and said predetermined sequence of checking addresses to determine whether or not the sequence of the input addresses coincides with said predetermined sequence of said checking addresses, the address sequence monitoring means including a plurality of address coincidence detecting circuits provided in correspondence to said address data storing circuits of said address data determining means, and a plurality of shift register circuits, made of DQ flip flop circuits, provided in correspondence to said plurality of address coincidence detecting circuits, the address coincidence detecting circuits each comparing the checking address stored in a corresponding address data storing circuit with the input addresses, and outputting a coincidence output signal when the checking address coincides with the input address, the shift register circuits each receiving the output signal of a corresponding coincidence detecting circuit, the shift register circuits being operated such that an output logic level of the shift register circuits is converted to an opposite logic level when the sequence of the input addresses is not in coincidence with the predetermined sequence of the checking addresses, the address sequence monitoring means further including a plurality of logic gates provided in correspondence to said address coincidence detecting circuits and said flip flop circuits, and a level inverter, each of the logic gates for receiving the output signal of a corresponding coincidence detecting circuit and an output signal of a corresponding flip flop circuit to output a logic signal to a CK terminal of the corresponding flip flop circuit;

an error data generating circuit for generating error data; and an output selection circuit for selecting data read from said memory cell array when said address sequence monitoring means determines that the sequence of the input addresses coincides with said predetermined sequence of said checking addresses, and selecting error data generated by said error data generating circuit when the sequence of the input addresses is not in coincidence with said predetermined sequence of the checking addresses, wherein SET terminals and RESET terminals of those of said flip flop circuits, which are of a first bit stage to a bit stage one bit stage prior to the final bit stage, are connected to a SET signal and a reference potential, respectively;

a SET terminal and a RESET terminal of that of said flip flop circuits, which is of the final bit stage, are connected to a reference potential and a SET signal, respectively;

those of said logic gates, which are of a first bit stage to a bit stage one bit stage prior to the final bit stage, are made of two-input AND gates;

that of said flip flop circuits, which is the final bit stage, is made of a two-input OR gate; and said level inverter is connected to Q output terminal of the final bit stage flip flop circuit to invert the level of the Q output signal forming an output signal of the address sequence monitoring means.

10. A semiconductor storage apparatus comprising:

a memory cell array for storing data;

reading means for reading data from said memory cell array in accordance with input addresses;

address data determining means in which checking addresses and a predetermined sequence of the checking addresses are stored, the address data determining means including a plurality of address storing circuits for storing said checking addresses and said predetermined sequence of the checking addresses;

address sequence monitoring means for monitoring a sequence of input addresses and said predetermined sequence of checking addresses to determine whether or not the sequence of the input addresses coincides with said predetermined sequence of said checking addresses, the address sequence monitoring means including a plurality of address coincidence detecting circuits provided in correspondence to said address data storing circuits of said address data determining means, and a plurality of shift register circuits, made of DQ flip flop circuits, provided in correspondence to said plurality of address coincidence detecting circuits, the address coincidence detecting circuits each comparing the checking address stored in a corresponding address data storing circuit with the input addresses, and outputting a coincidence output signal when the checking address coincides with the input addresses, the shift register circuits each receiving the output signal of a corresponding coincidence detecting circuit, the shift register circuits being operated such that an output logic level of the shift register circuits is converted to an opposite logic level when the sequence of the input addresses is not in coincidence with the predetermined sequence of the checking addresses, the address sequence monitoring means further including a plurality of logic gates provided in correspondence to said address coincidence detecting circuits and said flip flop circuits, and a level inverter, each of the logic gates for receiving the output signal of a corresponding coincidence detecting circuit and an output signal of a corresponding flip flop circuit to output a logic signal to a CK terminal of the corresponding flip flop circuit;

an error data generating circuit for generating error date; and an output selection circuit for selecting data read from said memory cell array when said address sequence monitoring means determines that the sequence of the input addresses coincides with said predetermined sequence of said checking addresses, and selecting error data generated by said error data generating circuit when the sequence of an input address is not in coincidence with said predetermined sequence of the checking addresses, wherein SET terminals and RESET terminals of those of said flip flop circuits which are of a first bit stage to a bit stage one bit stage prior to the final bit stage are connected to a SET signal and a reference potential, respectively;

a SET terminal and a RESET terminal of that of said flip flop circuits which are of the final bit stage are connected to a reference potential and a SET signal, respectively;

those of said logic gates, which are of a first bit stage to a bit stage one bit stage prior to the final bit stage, are made of two-input AND gates;

that of said flip flop circuits, which is the final bit stage, is made of a two-input OR gate; and said level inverter is connected to a Q output terminal of the final bit stage flip flop circuit to invert the level of the Q output signal forming an output signal of the address sequence monitoring means.

* * * * *

UNITED STATES PATENT AND TRADEMARK OFFICE
CERTIFICATE OF CORRECTION

PATENT NO. : 5,924,123
DATED : July 13, 1999
INVENTOR(S) : Yoshio MOCHIZUKI, et al.

It is certified that error appears in the above-identified patent and that said Letters Patent is hereby corrected as shown below:

On the title page, insert the following:

-- [30]  Foreign Application Priority Data

Apr. 24, 1996   [JP] Japan....... 8-102597--.

Signed and Sealed this

Ninth Day of May, 2000

Attest:

Q. TODD DICKINSON

*Attesting Officer*        *Director of Patents and Trademarks*